(12) United States Patent
Chen et al.

(10) Patent No.: US 7,392,358 B2
(45) Date of Patent: Jun. 24, 2008

(54) DELIVERY OF A MESSAGE TO A USER OF A PORTABLE DATA STORAGE DEVICE AS A CONDITION OF ITS USE

(75) Inventors: Jian Chen, San Jose, CA (US); Carlos J. Gonzalez, Los Gatos, CA (US); Daniel C. Guterman, Fremont, CA (US)

(73) Assignee: SanDisk Corporation, Milpitas, CA (US)

( * ) Notice: Subject to any disclaimer, the term of this patent is extended or adjusted under 35 U.S.C. 154(b) by 269 days.

(21) Appl. No.: 11/035,701

(22) Filed: Jan. 14, 2005

(65) Prior Publication Data

US 2006/0161749 A1 Jul. 20, 2006

(51) Int. Cl.
*G06F 12/00* (2006.01)
*G06F 13/00* (2006.01)
*G06F 13/28* (2006.01)
*G06F 3/00* (2006.01)
*G06F 5/00* (2006.01)
*G06Q 30/00* (2006.01)
*G07G 1/14* (2006.01)

(52) U.S. Cl. .................. 711/163; 711/152; 711/164; 711/156; 705/14; 710/36

(58) Field of Classification Search .......... 711/164, 711/163
See application file for complete search history.

(56) References Cited

U.S. PATENT DOCUMENTS

| 5,708,478 A * | 1/1998 | Tognazzini ............ 348/552 |
| 2001/0049661 A1 | 12/2001 | Power |
| 2002/0126304 A1 | 9/2002 | Jakobsson et al. |
| 2002/0145632 A1 | 10/2002 | Shmueli |
| 2003/0101092 A1 | 5/2003 | Fuller et al. |
| 2003/0123887 A1 | 7/2003 | Imes et al. |

(Continued)

FOREIGN PATENT DOCUMENTS

EP 1 378 836 A2 7/2004

(Continued)

OTHER PUBLICATIONS

EPO/ISA, "Invitation to Pay Additional Fees (including Communication Relating to the results of the Partial International Search," mailed in corresponding International Application No. PCT/US2006/000327 (Publication No. WO 2006/078460 A2) on Aug. 17, 2006, 6 pages.

(Continued)

*Primary Examiner*—Brian R. Peugh
*Assistant Examiner*—Ryan Bertram
(74) *Attorney, Agent, or Firm*—Davis Wright Tremaine LLP

(57) ABSTRACT

A memory card, flash memory drive or other removable re-programmable non-volatile memory device is configured so that at least part of the memory is not available for storage of user data until data of a message stored in the memory is at least read out by the user through a host device to which the memory device is connected. The message may be an advertisement, instructions on using the memory device, or the like, to which the user is at least exposed as a condition of having the full capacity of the memory card available thereafter for use by him or her.

18 Claims, 4 Drawing Sheets

U.S. PATENT DOCUMENTS

| | | |
|---|---|---|
| 2003/0169306 A1* | 9/2003 | Makipaa et al. ............. 345/864 |
| 2004/0010656 A1 | 1/2004 | Chiao et al. |
| 2004/0049645 A1 | 3/2004 | Lee et al. |
| 2004/0056087 A1 | 3/2004 | Bonneau, Jr. et al. |
| 2004/0132437 A1 | 7/2004 | Ohmori et al. |
| 2004/0193744 A1 | 9/2004 | Paley |
| 2004/0236918 A1* | 11/2004 | Okaue et al. ................ 711/164 |

FOREIGN PATENT DOCUMENTS

| | | |
|---|---|---|
| KR | 2003-0027924 | 4/2003 |
| WO | WO99/52056 | 10/1999 |
| WO | WO 02/23423 | 3/2002 |
| WO | WO 2006/078460 A2 | 7/2006 |

OTHER PUBLICATIONS

The Web Newsroom, Featurenews: Tech Watch, Watching the World of Technology, "Lexus is First to Use High-Tech Gadget", dated Jun. 17, 2003, downloaded from http://www.azreporter.com/news/features/techwatch/ on Jun. 22, 2004, 3 pages.

* cited by examiner

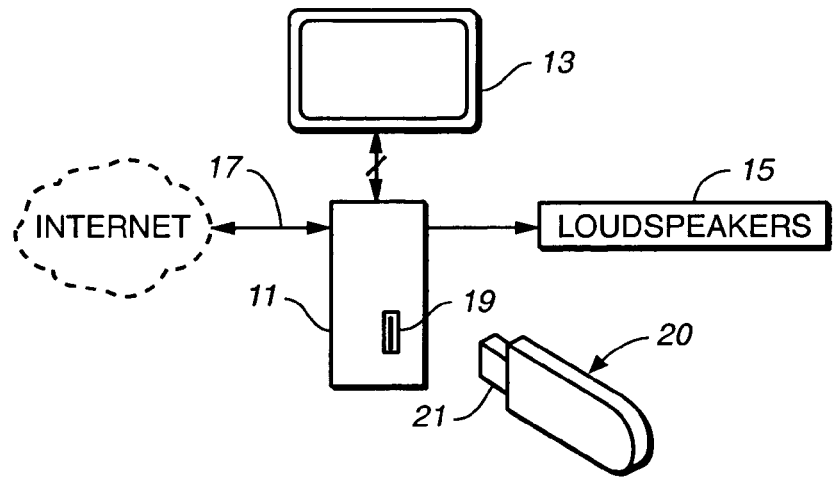
FIG._1
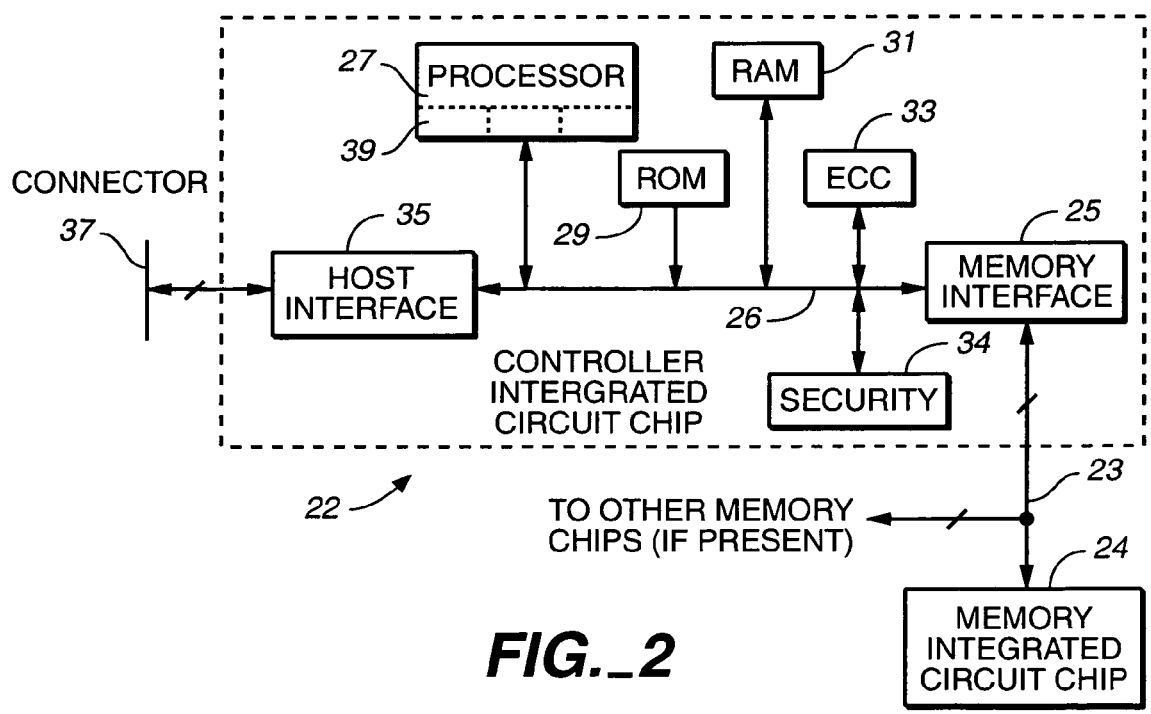
FIG._2

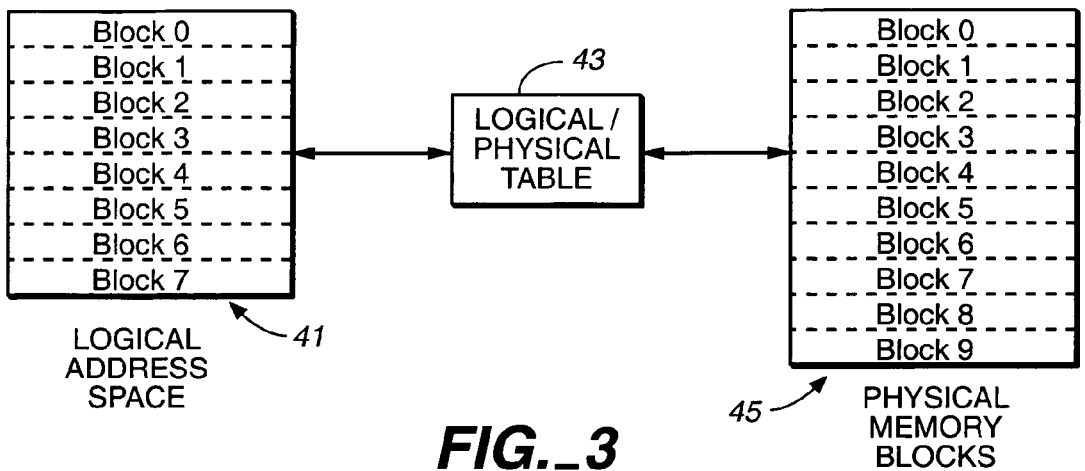
*FIG._3*
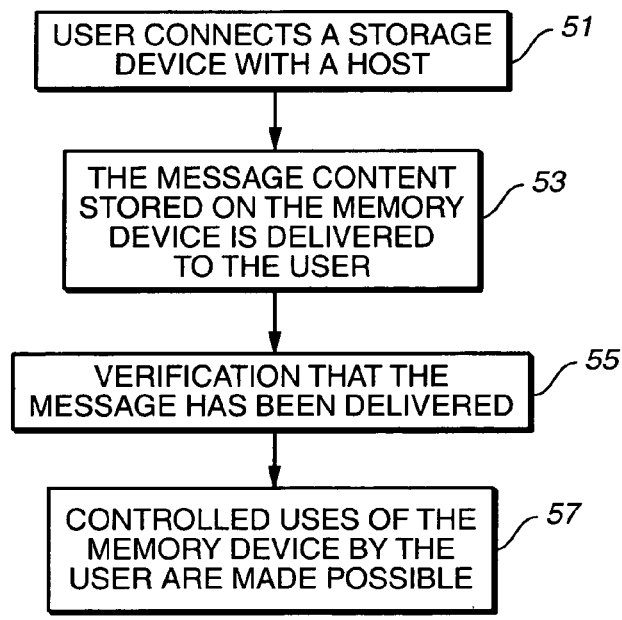
*FIG._4*
| Seg. 1 | $ADDR_0$ | $LENGTH_0$ | READ? YES/NO |
| --- | --- | --- | --- |
| Seg. 2 | $ADDR_1$ | $LENGTH_1$ | YES/NO |
| ⋮ | ⋮ | ⋮ | ⋮ |
*FIG._5*

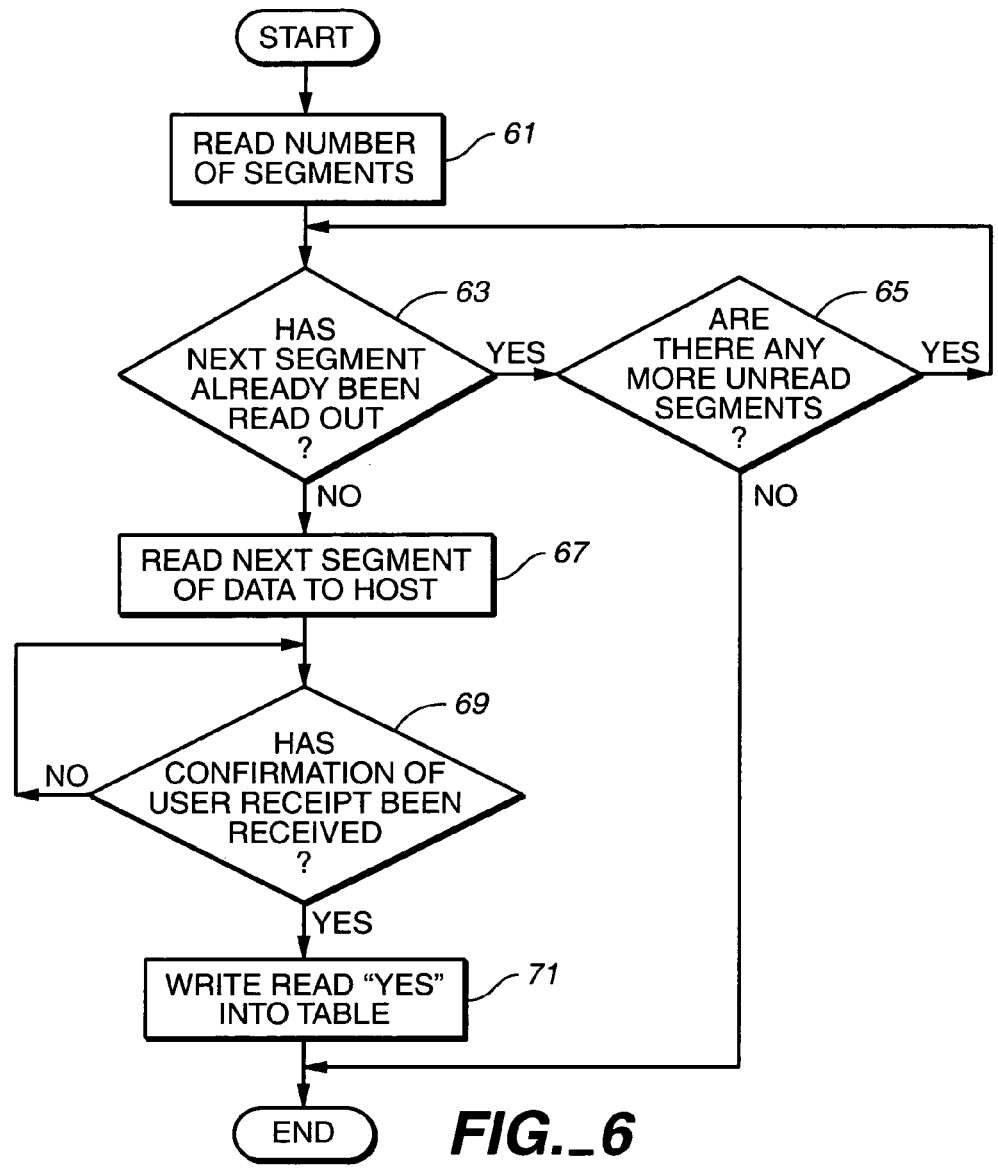
FIG._6
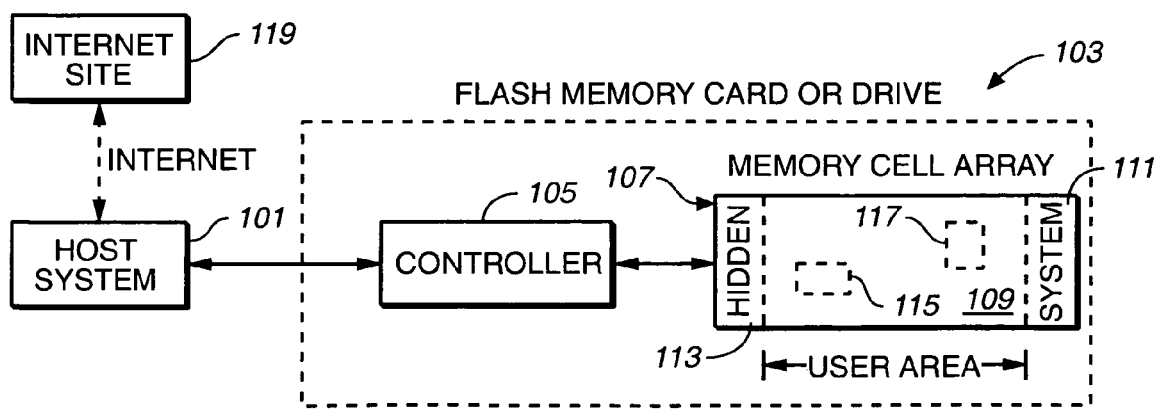
FIG._7

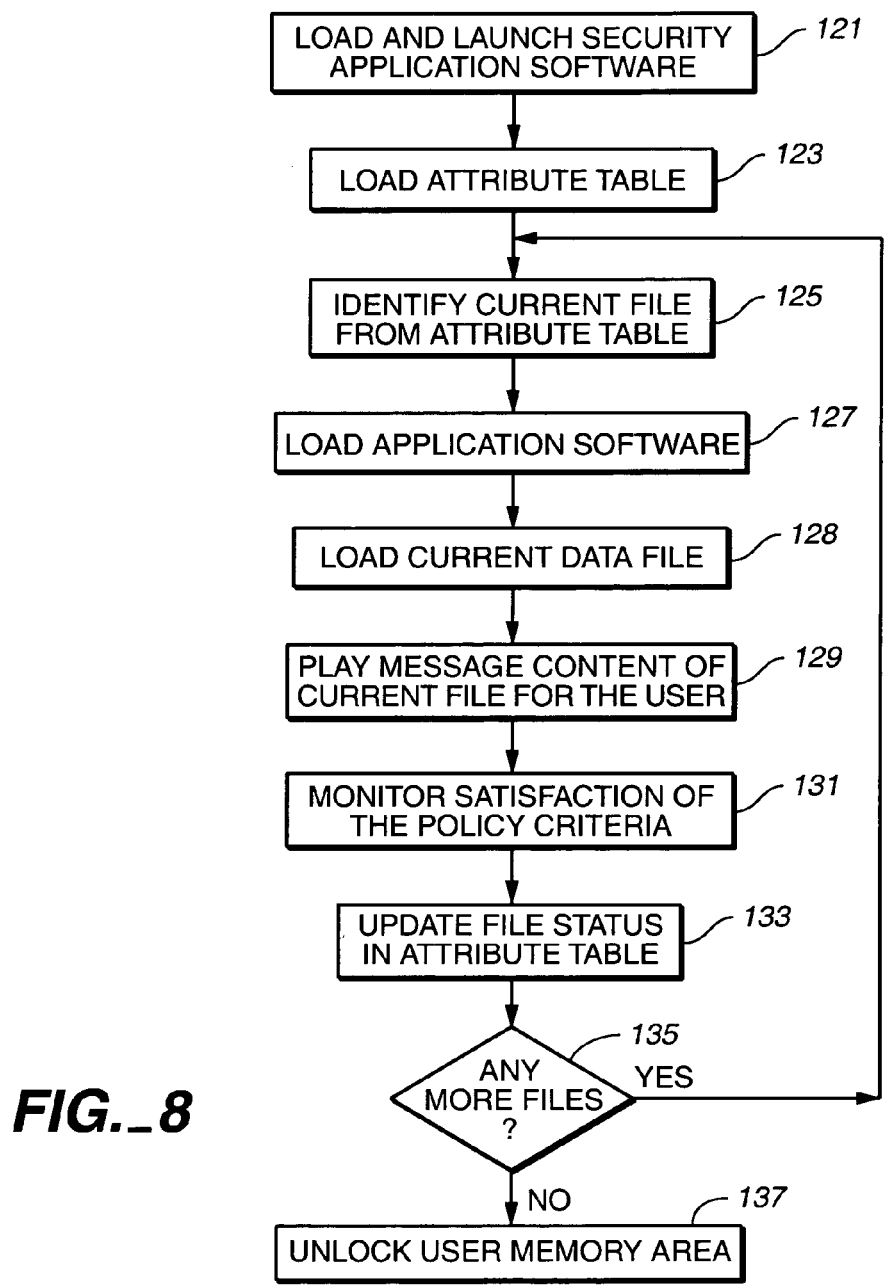
FIG._8
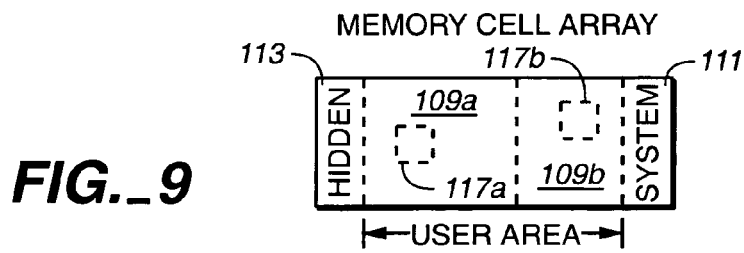
FIG._9

DELIVERY OF A MESSAGE TO A USER OF A PORTABLE DATA STORAGE DEVICE AS A CONDITION OF ITS USE

BACKGROUND OF THE INVENTION

This invention relates generally to the delivery of messages, such as advertising, to users of electronic systems employing removable re-programmable non-volatile memory devices such as memory cards, flash drives and rotating magnetic devices.

Electronic non-volatile memory cards are used with personal computers, notebook computers, cellular telephones, personal digital assistants (PDAs), digital still cameras, digital movie cameras, portable audio players and other host electronic devices for the storage of large amounts of data. Such cards usually contain a re-programmable non-volatile semiconductor memory cell array along with a controller or control function that controls operation of the memory cell array and interfaces with a host to which the card is connected. Flash memory cards have been commercially implemented according to a number of well-known standards. Popular types include cards sold under the CompactFlash (CF), MultiMediaCard (MMC), Secure Digital (SD), and Memory Stick trademarks, each of which is sold by SanDisk Corporation, the assignee hereof. These portable, hand-held memory cards are small, the largest length being 50 mm., the largest width 36.4 mm. and the largest thickness being 3.3 mm., in the above-mentioned group. More recently, even smaller memory cards have come to the marketplace, including the miniSD and TransFlash cards of SanDisk Corporation.

Other small, removable re-programmable non-volatile memory devices have also been made to interface with a computer or other type of host by including a Universal Serial Bus (USB) connector plug. These are especially convenient since personal computers and other types of hosts commonly include one or more USB connector receptacles but may not have a receptacle slot that accepts any of above identified standard memory cards. There are several USB flash drive products commercially available from SanDisk Corporation under its trademark Cruzer. USB flash drives are typically shaped differently than the memory cards described above but contain memory with similar amounts of data storage capacity. The mid-sized Cruzer flash drives have an elongated shape with a length of about 70 mm., including the USB connector plug at one end, a width of about 18 mm. and thickness of about 8 mm. The trend is to make flash drives even smaller. USB flash drives are commonly used as a replacement for floppy disks, storing personal and/or business data. Users often constantly carry the devices with them.

The higher end of the range of storage capacities of flash memory cards and drives that are currently available are one, two and four gigabytes (GBs). Miniature rotating magnetic disc drives are also available with greater storage capacities. One miniature disc product has the same form factor and electrical signal interface as the flash memory CF card.

The cost of certain of these devices, particularly the USB flash drives of relatively low storage capacity, are becoming low enough as to be given away, or sold at a discount, as a means of delivering an advertising message contained on the card. Flash drives with 8, 16, 32, 48 or 64 megabyte (MB) storage capacity are becoming inexpensive enough for such use. In one instance, for example, the Lexus division of Toyota Motors sent flash drives with 16 MB of storage capacity without charge to potential purchasers of its automobiles. Information describing a new model of automobile was contained as data in the flash drive that provided an interactive video display on a host computer with a USB receptacle into which the card's USB plug was inserted. The user could delete these advertising data from the flash drive in order to be able to free up for his or her personal use the storage capacity which had been occupied in storing the advertising data.

SUMMARY OF THE INVENTION

The present invention includes techniques for increasing the value to providers of data in such portable re-programmable non-volatile memory devices by communicating the message content to users of the memory devices. When the message content includes advertising, distribution of the memory devices without charge or at a deeply discounted price becomes feasible. At the same time, the value to the end user of a memory device, after receiving the message, is maintained. In general, restrictions on the use of the memory devices until the message is delivered to the user, and the methods of delivering the message, are chosen to maximize the value of the memory devices to both the message content providers and the end users. In this way, the distribution of the message content by such memory devices becomes feasible.

In one embodiment, data containing the message content are stored in the memory device itself, and full use of the device by the end user to store his or her own data requires that the user be at least exposed to the message. In one application, such devices can replace free optical CD ROM storage disks as a means to distribute message content. A major difference is that the memory device is useable for other purposes, and consequently it is not thrown away by the user before receiving the message, as are many free CD ROMs. In another embodiment, wherein the user's host system is connected to the Internet, the distributed memory device contains a link to an Internet site that contains the message content, which is then transmitted to the user's host system to which the device is connected. The Internet site may then enable full use of the memory device after the user is at least exposed to the message. In a further embodiment, the user may be directed from data on the memory device to call a specific telephone number that contains the message content in a recording. After the user is at least exposed to the message, a code is given that enables the user to unlock some or the entire memory device through its host for his or her own use.

Distribution of such memory devices for purposes other than the distribution of advertising content can also be of value. For example, instructions on how to use the memory device may be distributed this way. The user is at least exposed to the instructions the first time the device is connected to a host, after which the memory device may then be made fully operational to store his or her data. As another example, a user may be required to at least be exposed to instructions on how to use a host system with which a memory device is provided or adapted for use. A memory device sold with a camera, for instance, may contain instructions on use of the camera, in a manner that the user must at least be exposed to those instructions through a computer or other appropriate host before the memory device is fully useable to him or her. In these non-advertising applications, the memory devices will usually not be given away without charge since the content provider does not stand to gain further from the message being distributed. Rather, it is a way for suppliers of such memory devices and hosts with which they are used to have an increased assurance that important instructions about their use reach end user customers, for the benefit of both the suppliers and the end users. A specific benefit to content providers is that a resulting proper installation or use of a product, or an understanding of the product, reduces customer dissatisfaction and service calls.

In one specific embodiment, the memory devices made to carry the message content preferably include firmware and/or circuitry to limit or prevent access by the end user to a portion of the storage area chosen by the content provider, usually at least a portion of the memory containing the message content data, or pointers to it, until after the user receives the message. At the same time, the message content area of the memory needs to be accessible to selected entities for writing data of the message content or pointers, with security so that others cannot access such an area before an end user has at least been exposed to the message. Access to the entire memory space may even be blocked in some applications until there is an indication that the user has at least received the message. Such memory devices with these capabilities may therefore typically be sold at a premium by the memory device manufacturer to advertisers or their agents.

Alternatively, the manufacturer may load the message content data into the memory devices before their sale. If these memory devices are then distributed by the message content providers, the device manufacturer receives revenue for its services in doing so. In some cases, the manufacturer may alternatively distribute the memory devices through its normal retail distribution channels. When memory devices with advertising content are sold at a reduce price, or given away for free, the content provider pays the manufacturer to do so.

As a further aspect of the present invention, a memory device with at least a portion of its memory locked to the user until it receives an unlocking signal can have other applications in addition to the delivery of message data. Since the locked portion of the memory can be made accessible by the controller of the device, data or program instructions useful to operations of the controller can be stored there. But when such data or program instructions are no longer useful, the portion can be unlocked in order to increase the amount of memory available to the user to store his or her data.

In another specific embodiment, application software is stored in the memory device that is either automatically launched from the device when it is connected to a host or launched by the user after connection. The application software is then executed by the host. This application manages the viewing of the advertising or other content as well as the unlocking operations, or may only facilitate the unlocking if unlocking is done by a remote Internet site. Communication between the memory device and the host is preferably made secure, as is communication with an Internet site if that is part of the process. Security in communication between the host and memory device to control playing of advertising or other stored content and unlock the memory may be provided by one or more passwords, cryptographic keys, or other information stored on the memory devices along with the application software by their manufacturer or later by an entity that loads the advertising or other content into the memory devices.

Additional aspects, advantages and features of the present invention are included in the following description of exemplary examples thereof, which description should be taken in conjunction with the accompanying drawings.

BRIEF DESCRIPTION OF THE DRAWINGS

FIG. 1 shows a system in which various aspects of the present invention may be implemented;

FIG. 2 is a block schematic diagram of a memory system in which various aspects of the present invention may be implemented;

FIG. 3 illustrates addressing within the memory system of FIG. 2;

FIG. 4 is a general flowchart that illustrates various aspects of the present invention;

FIG. 5 is a table showing the contents of data records stored in the memory system of FIG. 2;

FIG. 6 is a flowchart showing one operation of the memory system of FIG. 2;

FIG. 7 illustrates a memory device working with a host system;

FIG. 8 is a flowchart showing the operation of the memory device of FIG. 7 with the host system; and FIG. 9 illustrates a modification of the memory device of FIG. 7.

DETAILED DESCRIPTION OF EXEMPLARY EMBODIMENTS

The various aspects of the present invention can be implemented with any of the memory devices described above in the Background, and others that may be available. The embodiments described hereinafter, however, emphasize use of a USB flash drive as an example.

Example Memory Device and its Use

As further background, FIG. 1 illustrates a personal desktop computer 11 that is commercially available, as a host system, having a monitor 13 and loudspeakers 15 connected to it. The computer 11 is also connected though a path 17 to the Internet, such as by a high-speed home or business connection. A flash drive 20 of the type described above in the Background is the removable memory device that is shown to be used. Its USB connector plug 21 is removably inserted by hand into a mating USB receptacle 19 of the computer 11. When so inserted, the memory within the flash drive 20 is connected to and made part of the memory available to the host system.

Of course, other memory devices can also be used, such as CF, MMC, SD memory cards, or the like. Whenever a host system does not contain a specific physical receptacle that receives the selected memory device, there is often a commercially available mechanical and/or electrical adaptor that can be interposed between them.

Referring to FIG. 2, a typical flash memory system of the type enclosed within the flash drive 20 is illustrated. The system controller is usually implemented on a single integrated circuit chip 22 that is connected in parallel with one or more integrated circuit non-volatile memory chips over a system bus 23, a single such memory chip 24 being shown. The bus 23 carries data being read from or programmed into the memory 24, addresses of locations within the memory where such data is stored, and control and status signals. Operation of the controller 22 to function in the ways described herein may be controlled by firmware, by hardware circuitry, or by a combination of both.

A typical controller chip 22 has its own internal conventional bus 26 that interfaces with the system bus 23 through interface circuits 25. The primary functional components normally connected to the controller bus 26 include a processor 27 (such as a microprocessor or micro-controller that runs code instructions), a read-only-memory (ROM) 29 containing, for example, code to initialize ("boot") the system, random-access-memory (RAM) 31 generally used to buffer data being transferred between the memory and a host as well as to temporarily store controller firmware, and circuits 33 that calculate and check an error correction code ("ECC") for managing accuracy of data passing through the controller between the memory and the host. The controller bus 26 interfaces with a host system through circuits 35, which, in the case of the flash drive 20 is done through contacts 37 that are part of the USB connector, plug 21, and therefore externally accessible.

Although the embodiments herein describe a memory card with externally accessible electrical contacts, another form of data interface can alternatively be employed. Wireless radio-frequency (rf) and optical (such as infra-red) communication are among other possibilities.

The controller may also contain industry standard security components 34 to perform such functions as data encryption, cryptographic authentication, data signing, or algorithms for performing these functions. A simple form of security may include password protection to inhibit access to a range of storage space, or more robust security may include the use of cryptographic functions to encrypt data and/or control access to a given area of the storage space of the memory device.

The memory chip 24, as well as any other memory chip(s) connected with the system bus 23, typically contains an array of re-programmable non-volatile memory cells organized into a number of blocks. Memory chips with a NAND architecture of flash memory cell arrays are currently preferred for large capacity memories. As with flash memory in general, memory cells of a NAND system must be erased before they can be programmed. The memory cells of the individual blocks are erasable together. That is, the memory cells in a block are the smallest unit of erase. Several pages of data are usually stored in each block, typically 8, 16 or more. Each page stores one or more sectors of data, each sector typically containing 512 bytes of user data plus some number of bytes of overhead data in the form of a header. The page is typically the smallest unit of programming and reading data. That is, the data of a page are written or read as part of one programming or read operation. Other memory array architectures are possible for use in the flash drive 20, such as those with a ROM architecture where a single sector of data is stored in a block, but the above-described flash memory architecture is currently a popular commercialized architecture for large capacity non-volatile re-writable electronic memories. Another architecture that can be used is one without erase blocks and which is single-byte accessible.

Although the controller 22 controls the operation of the memory chip 24 to program data, read data, erase and attend to various housekeeping matters, each memory chip also contains some controlling circuitry that executes commands from the controller to perform such functions. Further, the controller typically contains a number of registers for the temporary storage of control and status data during operation of the memory system, such as registers 39 within the processor 27. Although the memory system controller is shown in FIG. 2 to be on an integrated circuit separate from that of the memory cell array, the two can alternatively be combined on a single integrated circuit chip.

As conceptually shown in FIG. 3, logical addresses received from a host to which the memory system is connected are mapped into physical blocks within the memory system by the controller. In this example, simplified for ease of explanation, eight logical blocks 41, numbers 0-7, are mapped by a table 43, into eight of a total of ten physical blocks 45. That is, data known to the host by an address within its continuous address space are stored by the controller 22 in locations of the physical memory 24 chosen by it to optimize performance of the memory system. This results in data being stored within the memory with a physical order that will generally be different from the logical order assigned by the host. When logical-to-physical block assignments change, the table 43 is updated by the controller to reflect that change.

It is assumed for this explanation that the amount of data within one of the logical blocks 41 is the same as the storage capacity of one of the physical memory blocks 45, excluding the previously mentioned overhead area. There are usually more physical blocks provided than the number of logical blocks available to the user. In the example of FIG. 3, two additional physical blocks are included. One of these extra blocks may serve as a reserve block to store firmware, operating data, system parameters and the like in a non-volatile manner, and consequently is not available for the storage of user data. This block is then omitted from the map 43 so that it is not accessible by the host, although it is necessarily accessible by the controller of the memory device to read and store its housekeeping data. Controller firmware is usually loaded from the reserved block into the RAM 31 (FIG. 2) upon initialization of the system that occurs when the memory device is connected with a host and thereby is provided electrical power. The remaining extra block is included as a spare, a redundant block normally not included in the address translation table 43 but which may be substituted for one of the other blocks that might go bad, or as part of a wear level management implementation.

General Description of the Use of Memory Devices for Message Distribution

As part of controlling the delivery of message content data from the memory device and then, in response, freeing up an amount of its memory for use by the end user, the logical/physical addressing illustrated by FIG. 3 may be correspondingly controlled. For example, if the message content data are stored in logical block 5, the controller firmware can be configured to remove logical block 5 from the address space of the memory device during data programming operations while allowing access to read the message data from that logical block. Once confirmation is received by the memory device controller that the message data has been delivered in a specified manner, the firmware causes the restriction on logical block 5 to be removed, thereby allowing the user to thereafter erase and re-program data in logical block 5. This locking and unlocking operation can be extended to multiple blocks and even the entire logical address space of the memory. It also need not be limited to the block in which the message content data are stored, and can even extend to the entire logical address space. It can also be limited to one or a few pages within a single block. And although a given amount of memory space may initially be locked against re-programming, a portion of this locked space may be unlocked each time confirmation is received that message data has been read, until the entire locked memory space has been unlocked.

Data of a message to be delivered to the user of the memory device, or a link to part or all of that message stored elsewhere, are stored in one or more pages of a block of the memory 24 (FIG. 2), depending primarily upon the amount of data being stored. When all or substantially all of the message content data are stored in the memory 24, one or more of the blocks 45 will typically be devoted to storage of this data. But if only data of a pointer, or other form of direction to all or nearly all of the message content data located elsewhere, are stored in the memory 24, only a few pages of one block may be necessary. Such a pointer may be to an Internet site containing the data, a telephone number that the memory device user may use to access a recording of the message, or the like. In any event, at least the portion of the memory capacity devoted to storage of the message data or to storage of such a pointer is mapped out of the system, and thereby made unavailable for user storage from the user's point of view until the controller receives an indication that at least the message data have been read out of such portions. This feature provides an incentive for the memory device user to view and/or listen to the stored message.

A general operational flow diagram of FIG. 4 indicates the steps taken by the memory device user and by the operation of the device itself to assure that the user is exposed to the stored message and, in response, to add portions of the memory within the address space subsequently available to the user for writing and reading his or her own data. There are several variations that are possible to carry out each step.

To begin with, an individual end user (consumer) initially obtains a memory device of the type discussed above in the Background, including the flash drive 20 (FIG. 1). This device includes data related to the message content stored in one page, block or other portion of the memory. In a first step 51, the memory device is connected with a host such as by inserting its connector plug 21 in the connector receptacle 19 of the host computer 11. When the host is under power, and such power is then supplied to the memory device, user storage access to at least the portion of the memory containing the message data is denied the user, as one of the operations of the memory device controller 22 (FIG. 2), until it is confirmed that the user has at least been exposed to the associated message through the host or elsewhere.

The host preferably utilizes an operating system that recognizes the memory device for access to read and write data according to a known standard. If a flash memory device is of a type that emulates a CD-ROM device, for example, the memory device will be recognized by most versions of the Windows operating system and communication automatically takes place. This is a feature of the host operating system. If the memory device is a memory card with an ATA interface of a peripheral storage device, the Windows operating system will also recognize and communicate with such a card. If a memory card employs some other interface, it will be automatically recognized by the host if drivers for such a card are included in the host operating system. And if a memory card cannot be physically plugged directly into the host 11, an intermediate mechanical and/or electrical converter may be interposed between them. Reader/writer devices are commercially available that receive one or several different format memory cards and then connect them through, for example, the standard USB port of a computer or other host system.

There are several alternate ways in which the message content data may be stored and delivered to the user, the subject of step 53. As previously mentioned, examples are (1) to store all or substantially all of the data of the message in the memory device, (2) to store substantially only an address of an Internet site to which the host is directed to retrieve data of the message, or (3) to store a telephone number that the user calls to listen to the message.

The message may be delivered in response to a designated one of several events, one being the initialization of the memory device when first inserted into the host, or when the host with the memory device is turned-on. The message may be automatically delivered upon initialization or the user may be required to request delivery after the device initialization but before the memory device can be used by him or her. This may in one embodiment be done by launching the security application. The message is then delivered to the user through the host, either from data stored on the memory device or that obtained from the Internet site that such data causes the host to access, or both. The number of times the message is to be delivered can also be controlled by the firmware, one option being only once when the memory device is first used, another option being a limited number of times, and finally the message can be delivered each time the memory device is initialized. As another variation, different messages or different parts of a single message may be delivered on the occasion of each of several successive initializations.

If the memory device firmware does not automatically deliver data of the message content upon initialization, it may be necessary for the user to initiate, through the host, delivery of the message data to the host for viewing. If some substantial amount of the memory capacity are not available to the user for his or her use until the message content data are read, there is a substantial incentive for the user to do so. By allowing the user to select the time to view the message, rather than automatically delivering it upon initialization, more attention may be paid to it. It may also be required by the memory device firmware that the message content data be read several times, or that different messages be read at different times. An incentive for the user to do this can be supplied by freeing up an additional portion of the blocked memory for use each time the message is received, up to a maximum number of times when the entire memory device is then made available to the user.

The specific combination of options described herein that will be implemented in a specific group of memory devices depends in large part on the nature of the message, the purpose of conveying the message, and similar considerations. It is usually important that instructions on how to use the memory device be received by the user at the first initialization. Such instructions can include cautions on how to properly withdraw the memory device from the host using specified procedures contained in the host operating system and obtaining a message in response that the memory can be withdrawn safely without the risk of losing data. All of the associated instructions should preferably be provided at one time, rather than being conveyed in parts. No use of the memory device to program data should be permitted until its controller receives confirmation that the instructions have been received by the user. Similar considerations apply when instructions to use a camera, or other host with which the memory device interfaces and is supplied, are the message content stored in the memory device. Also, the message content can contain instructions of how to use a software application that runs on the host system to which the memory device is connected and/or one that utilizes the memory device in some way.

The message content data stored in the memory device may include any one or a combination of certain of text, video, audio, multi-media, video game, database or HTTP data files. Suitable application software on the host is then used to read such data file(s) and provide a visual and/or audio display of the message. Such software includes Word, PowerPoint, Excel, Adobe Acrobat and a media player, or proprietary display applications.

An indication that the message has been delivered is preferably required by the memory device firmware before additional memory space is unlocked for user programming, as indicated by a step 55 of FIG. 4. This indication can be as simple as the passage of a certain period of time after the message content data are read from the memory device by the host. If data of parts of the message, or of different messages, are delivered separately, this time period may be different for the various parts or messages. If the content data originate from an Internet site, then such a time-out indication may come from that site rather than the memory device firmware. But the effect is the same, namely to unlock the memory for the user. Alternatively, the requirement can be that any part of the message, or all of it, be delivered a set number of two or more times before the memory is unlocked.

For certain types of messages, it is preferable to require feedback from the user that he or she actually received the message and understood it. Therefore, rather than simply waiting a designated period of time before unlocking the memory, the memory device software or Internet site may maintain the memory lock until some feedback is received from the user through the host device. For example, the user can simply be asked at the end of the message to confirm that it was indeed received. It is better, however, to ask the user to answer one or more questions about the content of the message to assure that it has both been received and understood. Only after receiving correct responses is the memory unlocked to store the user's data.

Alternatively, if the message includes a series of pages, slides, video chapters, or other segments, the user can be asked to advance to the next segment after the message of the earlier segment has been absorbed. Although this may not be as positive an indicator that the user actually received the message as when questions about the message must be answered, it is less objectionable to the user and at least confirms that he or she was exposed to the entire message. It is therefore preferable to also impose a minimum time between advancing to the next segment in order to prevent the user from advancing through them faster than they can be absorbed.

Another form of content that may be utilized, either alone or as part of a message, is a video game. If the message may be conveyed by a video game, the user's interest in proceeding may be higher and there is positive feedback to the memory device firmware or Internet site that the user has been exposed to the message. The commands entered by the user to play the video game provide that response.

Once one of the indications described above has been received that the user has at least been exposed to the message, the memory device controller causes some part of the memory space to be unlocked, as indicated by step 57 of FIG. 4. In one form, only the pages or block containing the message have been locked, so this region of the memory is unlocked after its message content data are read. In another form, more of the memory but less than all of it have been locked, so this greater portion is unlocked when the message has been received by the user. Lastly, all of the memory may be locked and then unlocked in a controlled manner. All of the locked memory may be unlocked at one time or, alternatively, a portion of it may be unlocked in response to each of successive exposures by the user to different portions of one message, or repeats of the same message, having been confirmed, until it is all unlocked.

In order to respond with the message data upon initialization or when requested by the user, the memory device preferably maintains the beginning address, the length of the file, and other similar attributes of each segment of the message content data. This will generally be stored in a reserved block of the memory 24 (FIG. 2) that is not accessible by host systems through standard data read and write commands, and loaded by the controller 22 into its registers 39 upon initialization of the memory device. A table of FIG. 5 shows such attribute data. A first column identifies the segment number, the second column the beginning address ADDR of that segment and the third column the length LENGTH of that segment. Other attributes of the message content data segments as desirable may also be stored in the record of each segment. That record also contains, in the fourth column of FIG. 5, an indication whether that segment has been read or not. If the message has only one segment, there is only one record formed of one line of the attribute table of FIG. 5. If the same message data are being read out each time, the address ADDR and length LENGTH of each "segment" are the same. Alternatively, if different message content data are read out at different times, the address ADDR and possibly the length LENGTH of the segments will usually be different.

FIG. 6 is a flow diagram that illustrates a part of the initialization of the memory device to cause the message of any unread content data to be read from the non-volatile memory. The next unread message content data segment in the table of FIG. 5 is read, in this example, as part of each initialization of the memory device until all segments have been read. In a step 61 of this process, the number of segments in the table of FIG. 5 is determined. In a combination of next step 63 and a step 65, it is determined whether there are any segments listed in the table of FIG. 5 that have not been read. If so, the data of the next unread segment in order are read from the memory 24 (FIG. 2), in a step 67. The process then waits, in a step 69, for confirmation that the user has been exposed to the message. This can be done by a passage of time, by receiving correct answers from the user to questions posed by the message segment, or the like, as discussed above. When that confirmation is received, a "Yes" is written into the record of FIG. 5 (fourth column) for that segment in a step 71, and an associated amount of memory capacity is unlocked to enable access by the user to it. However, if at the step 65 it is determined that there are no more unread message content segments, the operation proceeds directly to the end, with no further messages to be read. Storage areas associated with the message segments have by then been freed for access by the user to write into and read data from them.

While the operation illustrated by FIG. 6 occurs each time the memory device is initialized, message content data are read from the memory only one time if there is only one data segment stored. After that first time, the process quickly ends, as indicated above, by the determination in the step 65 that there are no more unread content data segments. If there are two or more such data segments, the step 65 causes the processing to end after they have all been read. And, as mentioned above, each data "segment" may be the same data when a single message is being repeated for a number of times equal to the number of "segments" in the table of FIG. 5. In that case, the ADDR and LENGTH attributes of each record of FIG. 5 are the same.

When the message content is advertising, it may promote a product or a service by encouraging the user to utilize the advertised product or service. Advertising content may also include a coupon that gives the user a discount on a future purchase of the product or service. The coupon may be placed into a useful form by allowing the user to print one copy of the coupon through the host system to which the memory device is connected.

Embodiment of Host Execution of a Security Application

A specific implementation of the functions generally described above may utilize software that is executed by the host system. This software is referenced herein as the "security application." Although the security application could be downloaded by the host over the Internet, or provided in some other way, it is preferably stored on the memory device, in addition to the message content, and then read from the memory device by the host. The primary purposes of the security application are to manage access to the message content and unlock the memory for general use after the user satisfies certain criteria with respect to the message content. The memory device is initially supplied to the end-user with the memory controller causing a portion or all of its available memory space to be locked against access to programming data therein. When the security application determines that the end-user has been adequately exposed to a message, it sends a signal to the memory controller to unlock at least a portion of the memory that is linked to that message.

The security application either causes data of the message content stored in the memory to be played or is directed by a record in the memory to obtain the message data from an Internet site. The security application can either read the message data directly or launch another host software application on the host to play the message content data. The security application then monitors playing of the message content to ascertain when there has been an appropriate exposure of the end-user to the message content, and then signals the controller within the memory device when it is appropriate to release the locked portion of the storage space. The message content data may be embedded in the security application but more typically are stored separately on the memory device or an Internet site.

Security functions that interact with those on the controller may be included in the security application. Some level of security is preferably provided against unauthorized access to and operation of the memory device to unlock the memory without the user first being exposed to the advertising or other message content in the desired manner. Transfers of at least the security application data and unlocking commands between the host system and the memory device are preferably subjected to some level of security, such as by requiring use of a unique password to enable such transfers, transferring the data and commands in an encrypted form, data signing, or other like security techniques. A similar level of security may be provided for accessing message content data from the Internet, when that is utilized. The memory system portion of such security may be implemented by the circuits 34 of its controller 22 (FIG. 2), particularly to encrypt data passing out the memory system and decrypt data passing into the memory system.

An example of an implementation of the foregoing is illustrated generally by FIG. 7. A host system 101 has a removable memory device 103 plugged into it. The memory device includes a usual controller 105, memory cell array 107 and circuits (not shown) peripheral to the array. The array 107 usually includes an area 109 that is set aside for user data, an area 111 for system data and an area 113 that is hidden from access from outside of the memory device but which is usable by the controller. Within the user data area 109 are the security application software 115 and data 117 of one or more advertising or other type of messages. Alternately, one or both of the security application and message data can be stored at a site 119 that is accessible by the host 101 over the Internet. The memory device then instead stores data that directs the host to the Internet site 119.

The user area 109 of the memory device is usually accessible by the host for writing data thereto and reading data therefrom. In this case, the controller 105 prevents such access to the entire user area 109 until it receives a command from the host 101, in the course of executing the security application 115, to unlock the user area. This command is issued after the user has been exposed to the message content of the data 117 to a prescribed extent and manner.

When the memory device 103 is first connected with the host 101, the security application software 115 may be automatically loaded into the host and opened by it, if the host operating system software is configured to support an auto-run capability. Alternatively, the user may be required to first enter commands through the host to read the security application software 115 in a normal manner, and then launch it.

Once the message of the data 117 has been played for the user in the specified manner, the host, as part of executing the application software 115, sends a command to the memory controller 105 to unlock the user area 109, after which the user may program data into and read data from the user area in a normal manner.

Information about the message data 117 to be played and of the requirements of user exposure to the message that must be met before the user area 109 will be unlocked is preferably maintained by an attribute table stored within the memory array 107. Data of each message that must be played before the user area 109 will be unlocked is most conveniently maintained as a separate file. In some cases there is only one such file, and in other cases there are multiple files. An example set of fields that may be maintained in this attribute table for each file are as follows:

1. File ID: A file number or some other unique identification of each file.
2. User Rights: Rights in the user area 109 prior to being unlocked: typically read-only or no access permitted.
3. File Location: A beginning address of the file within the memory device, or an Internet address if the file is located at an Internet site.
4. Application: The application software program required to play the message is identified. Such application software will most commonly reside on the host but could also be accessed over the Internet. Alternatively, it may be specified that the security application software may play the file.
5. Policy Criteria: This is the necessary exposure of the user to the message from the file, which may be based on the time that the user is exposed to the message, certain feedback of the user through the host such as providing correct answers to questions posed in the message, responses to a game included in the message, and so on.
6. Unlocked Portion: In cases where a portion of the user area 109 is unlocked after each message is played, rather than the entire area being unlocked only at the end of the process, a field indicates the portion of the user area that is to be unlocked upon the policy criteria for this one file being satisfied.
7. Status: Initially, a flag will indicate that the policy criteria have not been met for the file, and thus the user area of the memory is to be locked, but after the policy criteria have been met, the host writes another flag to indicate that the user area may be unlocked.

An example of the execution of the security application software 115 for one or more files of message data 117 is illustrated by the flowchart of FIG. 8. In a first step 121, the security application software 115 is read from the memory device 103 into a memory of the host 101 and launched in one of the ways discussed above. In a next step 123, the attribute table described above is also read by the host 101 from the memory device 103 and temporarily stored in a host memory. A special read command not generally provided in host systems is preferably used. The current message data file to be read is then identified by a step 125. The status fields of the entries of the message file table are read in order, the current file being the first in the attribute table where the status flag indicates that its policy criteria have not yet been met. The first time this is done for a memory device, the first file in the table is selected as the current file. And, of course, if there is only one file in the table, that file is the current file and the processing ends after its policy criteria are met.

In a next step 127, the host loads the application software specified by the attribute table for the current file. This can be a word processing program, a graphics program, a photograph reader, animation software or the like. If the application software field of the current file table entry specifies that the security application software is to be used, then this step 127 is skipped since the security application has already been launched by the host. The current message data file is then loaded into the host, as indicated by a step 128, either by reading the data 117 in the memory device 103 or by accessing the data from the Internet site 119 (FIG. 7), depending upon the contents of the attribute table File Location field. In a next step 129, the security application software is executed with respect to the message content data file, in the manner specified by the attributes for the current file within the attribute table.

The typical result of executing the application software is that an advertising or other type of message is played for the user by the application software loaded in the step 127. This most commonly provides a visual display on the monitor of the host system 101 but could alternatively be a sound message played through the host sound system, or a combination of both. The security application, as indicated by the step 131, monitors this playing to identify when the Policy Criteria specified for the current file have been satisfied. This can be a simple time out, or can look for user responses, such as through a keyboard and mouse of the host system 101, that match those included in the Policy Criteria.

Once those Policy Criteria have been satisfied, the Status field for the current file is updated to indicate this, at a step 133. This update is also preferably performed by a special host command. The security application normally executes this function but, alternatively, the application software running on the host may be configured to receive the response that the Policy Criteria have been satisfied and then cause the Status field to be updated in the attribute table in the memory device. Further, an Internet site being used may receive this response and cause the Status field of the attribute table to be updated.

That completes execution of the security application for the first message data file. If there is another data file listed in the attribute table, as determined by a step 135, then the steps 125, 127, 129, 131 and 133 are executed by the security application on data of this next file as the current file, with its table attributes. Once this has been done for all the message data files listed in the table, a next step 137 includes the host sending the memory controller 105 a special command to unlock the user area 109.

In the example of FIG. 8, the user area 109 is controlled in total between the limited or no access state and a full access state. Alternatively, when there are multiple message data files, a portion of the user area can be unlocked after the Policy Criteria of each file are satisfied. This is the purpose of the Unlocked Portion field of the table file entries. Appropriate steps are added to the process of FIG. 8 to do so.

The process illustrated in FIG. 8 will halt if the memory device is removed from its connection with the host system, or is otherwise powered down, before being completed. In such a case, the process will pick up where it left off once the memory device is reinserted into the host receptacle and the memory system started up again, because the table will have been updated to reflect the progress through the completed steps of the process before the loss of power.

The memory device 103 has been described to have a single, unpartitioned user area 109. Alternatively, the user area may be divided into two or more areas that are controlled independently. An example of a user area partitioned into two regions is shown in FIG. 9, where the user region 109 of FIG. 7 has been divided into regions 109*a* and 109*b*. Each of these regions preferably stores respective message content data 117*a* and 117*b* of one or more files each. Each region is operated separately in the manner illustrated in FIG. 8. After the data 117*a* has been read by the security application and the user has met the policy criteria for the data content, the user region 109*a* is unlocked. The second user region 109*b* remains locked until the same process is performed with the message data 117*b* stored in that region. A separate message may be conveyed by the data 117*a* or 117*b*, or the same message may be repeated. The user region is unlocked in parts in response to the user satisfying the policy criteria for each part in sequence. This can also be extended to a user region that is partitioned into more than two parts.

Dividing the user memory space into two or more regions may be accomplished in one of several ways. One approach is to cause each region to be recognized by the host operating system as a separate drive. Each region then typically has its own file allocation table (FAT). The capability of the host writing data to each drive is then independently controlled. Once the policy criteria for the message data stored in each separate drive partition have been met, the properties for that drive are changed to allow writing data to that region.

Another method of operating a divided user memory space includes assigning each region with a logical unit number (LUN) that is recognized by the host operating system. Each LUN can be set to make its corresponding memory region either read-only or read/write. Initially, a property of each LUN is set to read-only. Once the policy criteria for all message content data file(s) in one region are satisfied, a property of the LUN for that region is then changed to read/write, while the LUN properties for any remaining regions remain read-only.

Although the message data are shown in FIG. 9 to be stored in the individual regions to which they relate, these data may be stored elsewhere within the memory 103. Similarly, the security application software may also be written to some portion of the memory other than the user data portions.

Storing Message Content Data in the Memory Device

The manufacturer of memory devices may partition the memory, program the message content data into them, write one of the attribute tables described above, set the properties of the user data region(s) to be locked against ordinary user programming, and/or other related actions. However, it may be more convenient for the memory devices to be manufactured and distributed to others without the message content data or attribute table being written but with one or more user data regions being locked against user programming. Customers of the manufacturer can then store their own message content data but since such data are to be stored in the locked portion of the memory, some technique must obviously be included for programming the message content data into the locked portion without allowing the end user customers of the memory devices to do so. The following describe two different techniques for programming data into the locked address space.

In a first technique, the operating firmware of the controller 22 (FIG. 2) is made to recognize a special programming command that is different from the usual programming command in the specifications of the memory device. Common applications running on host systems, such as personal computers, notebook computers, PDAs and the like are not able to program data in the locked logical address range. But with use of the special programming command, an advertiser or other content provider may have their individual message content data stored in the locked portion. At the same time, the attribute table is written by the controller into the reserved block of the memory.

The second technique includes the use of a password stored in the memory. The firmware of such a memory device then causes the standard programming command, when the logical address is specified to be within the locked range, to result in a password being requested before executing the command to store the data within locked address range. A password input through the host to which the memory device is connected is then compared with that stored in the memory device. If they compare, programming to the locked region is permitted. If they do not compare, the programming operation is refused. The password may be stored in the reserved memory block to which the host has no access. The password may be stored by use of a higher security technique if that is deemed warranted.

Alternately, more powerful cryptographic security operations may be employed. In some cases, the message content owner or the memory device manufacturer may share cryptographic layers for later authentication. Suitable anti-hacker countermeasures may also be implemented so as to thwart attempts to circumvent the security.

The attribute table may be loaded during manufacture into the memory device and stored by the controller in a portion of the memory reserved for system data, outside of the normal user data address range. These data may be encrypted or other measures taken to deter tampering, particularly with the policy criteria data fields. The policy criteria data may be loaded by the controller into a buffer memory during a power-on or other initialization of the memory device in order to set-up the appropriate controls of the user space in accordance with the policy criteria.

In order to provide convenience and security at the site of the manufacturer or content provider where the message data and attribute table are written to memory devices, a special utility may be provided. The utility could partition the memory device storage medium into different logical areas, the access to each of which may be separately controlled. It could then store the message content data into a designated one of the partitioned areas. The security application software could be loaded into a unified area of the memory storage space or to multiple areas. Cryptographic keys, passwords or other information that will later be used to authenticate the security application software or provide secure communication with an Internet site would be written to the memory. The attribute table would be loaded, preferably into a secure area of the storage space. Unless the memory controller locks the memory space during system initialization, the memory device is locked into the desired initial configuration during this configuration.

Such a configuration utility may also include a limitation on the number of memory devices that it will configure, or count them and report them to either the manufacturer or content provider, as appropriate. Use of the utility may also be secured so that it can be used only with passwords or cryptographic keys provided by the memory manufacturer.

CONCLUSION

Although the various aspects of the present invention have been described with respect to exemplary embodiments thereof, it will be understood that the present invention is entitled to protection within the full scope of the appended claims.

The invention claimed is:

1. A removable memory device, comprising:
an enclosure,
a re-programmable non-volatile memory within the enclosure,
a data interface,
a controller including a processor and controller memory within the enclosure and operably connected between the non-volatile memory and the data interface to control operation of the non-volatile memory including programming the non-volatile memory with data received through the data interface and reading data from the non-volatile memory for passing the read data through the data interface,
data of the content of a message retrievable from data stored in a designated portion of the non-volatile memory,
wherein at least the designated portion of the non-volatile memory is locked against the programming of data thereinto that are received through the data interface unless at least some of the data of the content of the message have at least been read, after which at least the designated portion of the non-volatile memory is unlocked for programming data thereinto, and
wherein the data stored in the non-volatile memory includes data that directs a host with which the memory device is connected through its data interface to a specific Internet site to cause the host to retrieve data of the content of the message from the Internet site.

2. The memory device of claim 1, wherein the lock against programming said at least the designated portion of the non-volatile memory is removed in
a controller including a processor and controller memory within the enclosure and operably connected between the non-volatile memory and the data interface to control operation of the non-volatile memory including programming the non-volatile memory with data received through the data interface and reading data from the non-volatile memory for passing the read data through the data interface,
data of the content of a message retrievable from data stored in a designated portion of the non-volatile memory,
wherein at least the designated portion of the non-volatile memory is locked against the programming of data thereinto that are received through the data interface unless at least some of the data of the content of the message have at least been read, after which at least the designated portion of the non-volatile memory is unlocked for programming data thereinto, and
wherein the content of the message includes a coupon redeemable for a discount on a future purchase of a product or service.

3. A removable memory device, comprising:
an enclosure,
a re-programmable non-volatile memory within the enclosure,
a data interface,
a controller including a processor and controller memory within the enclosure and operably connected between the non-volatile memory and the data interface to control operation of the non-volatile memory including programming the non-volatile memory with data received through the data interface and reading data from the non-volatile memory for passing the read data through the data interface,
data of the content of a message retrievable from data stored in a designated portion of the non-volatile memory,
wherein at least the designated portion of the non-volatile memory is locked against the programming of data thereinto that are received through the data interface unless at least some of the data of the content of the message have at least been read, after which at least the designated portion of the non-volatile memory is unlocked for programming data thereinto, and wherein the lock against programming said at least the designated portion of the non-volatile memory is removed in response to receipt of data of a code provided as part of the audio recording after the message content has at least been played once.

4. A removable memory device, comprising:
an enclosure,
a re-programmable non-volatile memory within the enclosure,
a data interface.

5. A removable memory device, comprising:
an enclosure,
a re-programmable non-volatile memory within the enclosure,
a data interface,
a controller including a processor and controller memory within the enclosure and operably connected between the non-volatile memory and the data interface to control operation of the non-volatile memory including programming the non-volatile memory with data received through the data interface and reading data from the non-volatile memory for passing the read data through the data interface,
data of the content of a message retrievable from data stored in a designated portion of the non-volatile memory,
wherein at least the designated portion of the non-volatile memory is locked against the programming of data thereinto that are received through the data interface unless at least some of the data of the content of the message have at least been read, after which at least the designated portion of the non-volatile memory is unlocked for programming data thereinto, and
wherein the content of the message includes instructions for using the memory device.

6. A removable memory device, comprising:
an enclosure,
a re-programmable non-volatile memory within the enclosure,
a data interface,
a controller including a processor and controller memory within the enclosure and operably connected between the non-volatile memory and the data interface to control operation of the non-volatile memory including programming the non-volatile memory with data received through the data interface and reading data from the non-volatile memory for passing the read data through the data interface,
data of the content of a message retrievable from data stored in a designated portion of the non-volatile memory,
wherein at least the designated portion of the non-volatile memory is locked against the programming of data thereinto that are received through the data interface unless at least some of the data of the content of the message have at least been read, after which at least the designated portion of the non-volatile memory is unlocked for programming data thereinto, and
wherein the content of the message includes instructions for using a host device with which the memory device is connectable.

7. A removable The memory device, comprising:
an enclosure,
a re-programmable non-volatile memory within the enclosure,
a data interface,
a controller including a processor and controller memory within the enclosure and operably connected between the non-volatile memory and the data interface to control operation of the non-volatile memory including programming the non-volatile memory with data received through the data interface and reading data from the non-volatile memory for passing the read data through the data interface,
data of the content of a message retrievable from data stored in a designated portion of the non-volatile memory,
wherein at least the designated portion of the non-volatile memory is locked against the programming of data thereinto that are received through the data interface unless at least some of the data of the content of the message have at least been read, after which at least the designated portion of the non-volatile memory is unlocked for programming data thereinto, and
wherein the content of the message includes instructions for using a software application.

8. A removable memory device, comprising:
an enclosure,
a re-programmable non-volatile memory within the enclosure,
a data interface, including a plurality of electrical contacts accessible from outside of the enclosure that are part of a plug according to a Universal Serial Bus (USB) standard,
a controller including a processor and controller memory within the enclosure and operably connected between the non-volatile memory and the data interface to control operation of the non-volatile memory including programming the non-volatile memory with data received through the data interface and reading data from the non-volatile memory for passing the read data through the data interface,
data of the content of a message retrievable from data stored in a designated portion of the non-volatile memory,
wherein at least the designated portion of the non-volatile memory is locked against the programming of data thereinto that are received through the data interface unless at least some of the data of the content of the message have at least been read, after which at least the designated portion of the non-volatile memory is unlocked for programming data thereinto, and
wherein the lock against programming said at least the designated portion of the non-volatile memory is removed on only a portion thereof after each occurrence of the message being read two or more times.

9. A removable memory device, comprising:
an enclosure,
a re-programmable non-volatile memory within the enclosure,
a data interface,
a controller including a processor and controller memory within the enclosure and operably connected between the non-volatile memory and the data interface to control operation of the non-volatile memory including programming the non-volatile memory with data received through the data interface and reading data from the non-volatile memory for passing the read data through the data interface, data of the content of a message retrievable from data stored in a designated portion of the non-volatile memory, wherein at least the designated portion of the non-volatile memory is locked against the programming of data thereinto that are received through the data interface unless at least some of the data of the content of the message have at least been read, after which at least the designated portion of the non-volatile memory is unlocked for programming data thereinto, wherein at least the designated portion of the non-volatile memory is locked against programming data received through the data interface unless at least some of the data of the content of the message have been read and data of a response from the user are received, after which said at least the designated portion of the non-volatile memory is unlocked, and wherein the data of the content of the message includes two or more segments, and wherein the data of the response from the user that causes the controller to unlock said at least the designated portion of the non-volatile memory includes the user initiating the reading of the two or more segments of the message individually.

10. A removable memory device, comprising:
an enclosure,
a re-programmable non-volatile memory within the enclosure,
a data interface,
a controller including a processor and controller memory within the enclosure and operably connected between the non-volatile memory and the data interface to control operation of the non-volatile memory including programming the non-volatile memory with data received through the data interface and reading data from the non-volatile memory for passing the read data through the data interface,
data of the content of a message retrievable from data stored in a designated portion of the non-volatile memory,
wherein at least the designated portion of the non-volatile memory is locked against the programming of data thereinto that are received through the data interface unless at least some of the data of the content of the message have at least been read, after which at least the designated portion of the non-volatile memory is unlocked for programming data thereinto,
wherein at least the designated portion of the non-volatile memory is locked against programming data received through the data interface unless at least some of the data of the content of the message have been read and data of a response from the user are received, after which said at least the designated portion of the non-volatile memory is unlocked, and
wherein the data of the response from the user that causes the controller to unlock said at least the designated portion of the non-volatile memory includes a correct answer to each of at least one question contained within the data of the content of the message about a substance of the message.

11. A method of distributing a message, comprising:
storing data in a plurality of re-programmable non-volatile memory devices that are at least related to the message,
preventing programming of at least a portion of the storage capacity of the memory devices until a subsequent occurrence, and
configuring the plurality of memory devices to respond to the subsequent occurrence to allow programming of said at least the portion of the storage capacity thereafter, the subsequent occurrence including an indication that at least data of the message have been read,
wherein the content of the message includes a coupon redeemable for a discount on a future purchase of a product or service.

12. A method of distributing a message, comprising:
storing data in a plurality of re-programmable non-volatile memory devices that are at least related to the message,
preventing programming of at least a portion of the storage capacity of the memory devices until a subsequent occurrence, and
configuring the plurality of memory devices to respond to the subsequent occurrence to allow programming of said at least the portion of the storage capacity thereafter, the subsequent occurrence including an indication that at least data of the message have been read, wherein the content of the message includes instructions for using the memory device.

13. A method of distributing a message, comprising:
storing data in a plurality of re-programmable non-volatile memory devices that are at least related to the message,
preventing programming of at least a portion of the storage capacity of the memory devices until a subsequent occurrence, and
configuring the plurality of memory devices to respond to the subsequent occurrence to allow programming of said at least the portion of the storage capacity thereafter, the subsequent occurrence including an indication that at least data of the message have been read, wherein the content of the message includes instructions for using a host device with which the memory device is connectable.

14. A method of distributing a message, comprising:
storing data in a plurality of re-programmable non-volatile memory devices that are at least related to the message,
preventing programming of at least a portion of the storage capacity of the memory devices until a subsequent occurrence, and
configuring the plurality of memory devices to respond to the subsequent occurrence to allow programming of said at least the portion of the storage capacity thereafter, the subsequent occurrence including an indication that at least data of the message have been read, wherein the content of the message includes instructions for using a software application.

15. The method of claim 11, wherein the data related to the message are stored in said at least the portion of the storage capacity to which programming is allowed in response to the subsequent occurrence.

16. The method of claim 12, wherein the data related to the message are stored in said at least the portion of the storage capacity to which programming is allowed in response to the subsequent occurrence.

17. The method of claim 13, wherein the data related to the message are stored in said at least the portion of the storage capacity to which programming is allowed in response to the subsequent occurrence.

18. The method of claim 14, wherein the data related to the message are stored in said at least the portion of the storage capacity to which programming is allowed in response to the subsequent occurrence.

* * * * *

UNITED STATES PATENT AND TRADEMARK OFFICE
CERTIFICATE OF CORRECTION

| | |
|---|---|
| PATENT NO. | : 7,392,358 B2 |
| APPLICATION NO. | : 11/035701 |
| DATED | : June 24, 2008 |
| INVENTOR(S) | : Chen et al. |

It is certified that error appears in the above-identified patent and that said Letters Patent is hereby corrected as shown below:

Column 16, line 27; after "removed in", delete "a controller including a processor and controller memory within the enclosure and operably connected between the non-volatile memory and the data interface to control operation of the non-volatile memory including programming the non-volatile memory with data received through the data interface and reading data from the non-volatile memory for passing the read data through the data interface,
  data of the content of a message retrievable from data stored in a designated portion of the non-volatile memory,
    wherein at least the designated portion of the non-volatile memory is locked against the programming of data thereinto that are received through the data interface unless at least some of the data of the content of the message have at least been read, after which at least the designated portion of the non-volatile memory is unlocked for programming data thereinto, and
    wherein the content of the message includes a coupon redeemable for a discount on a future purchase of a product or service."

and insert -- in response to data received over the Internet that the data of the content of the message has at least been read from the Internet site. --.

Column 17, line 14, after "a data interface", next line insert -- a controller including a processor and controller memory within the enclosure and operably connected between the non-volatile memory and the data interface to control operation of the non-volatile memory including programming the non-volatile memory with data received through the data interface and reading data from the non-volatile memory for passing the read data through the data interface,
  data of the content of a message retrievable from data stored in a designated portion of the non-volatile memory,
    wherein at least the designated portion of the non-volatile memory is locked against the programming of data thereinto that are received through the data interface unless at least some of the data of the content of the message have at least been read, after which at least the designated portion of the non-volatile memory is unlocked for programming data thereinto, and
    wherein the content of the message includes a coupon redeemable for a discount on a future purchase of a product or service. --

UNITED STATES PATENT AND TRADEMARK OFFICE
CERTIFICATE OF CORRECTION

| | | |
|---|---|---|
| PATENT NO. | : 7,392,358 B2 | |
| APPLICATION NO. | : 11/035701 | |
| DATED | : June 24, 2008 | |
| INVENTOR(S) | : Chen et al. | |

It is certified that error appears in the above-identified patent and that said Letters Patent is hereby corrected as shown below:

Column 17, line 66, after "removable" and before "memory" delete --The--.

Signed and Sealed this

Ninth Day of June, 2009

JOHN DOLL
*Acting Director of the United States Patent and Trademark Office*